Figure 4:
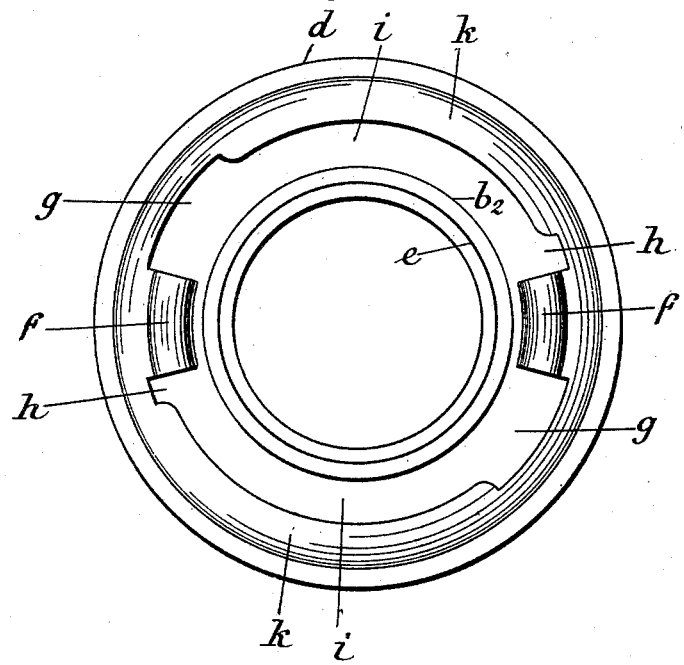

(No Model.) 2 Sheets—Sheet 1.
C. A. G. STORZ.
HOSE PIPE COUPLING.
No. 489,106. Patented Jan. 3, 1893.
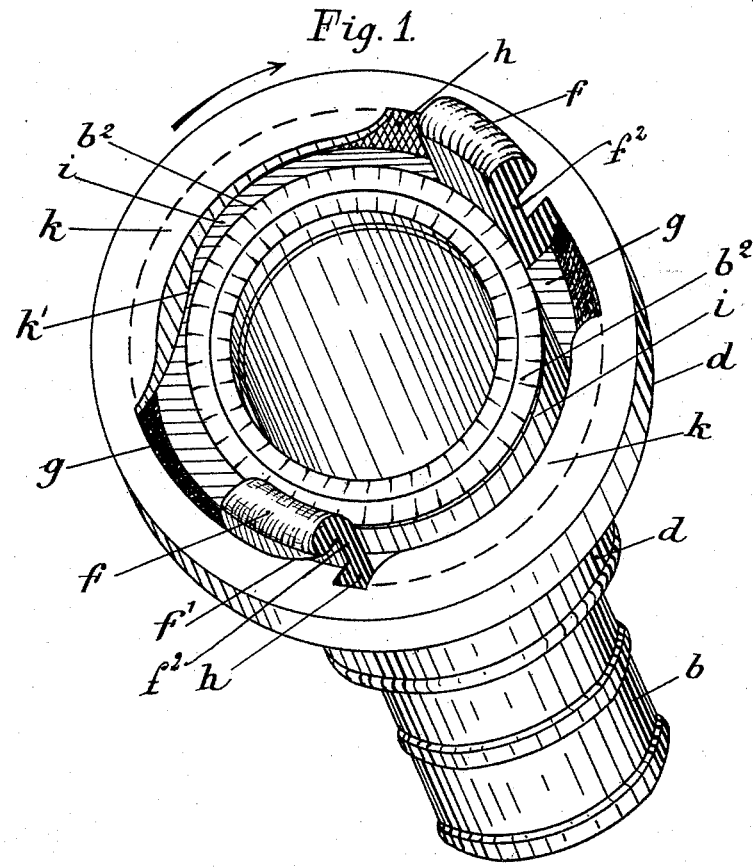
Fig. 1.
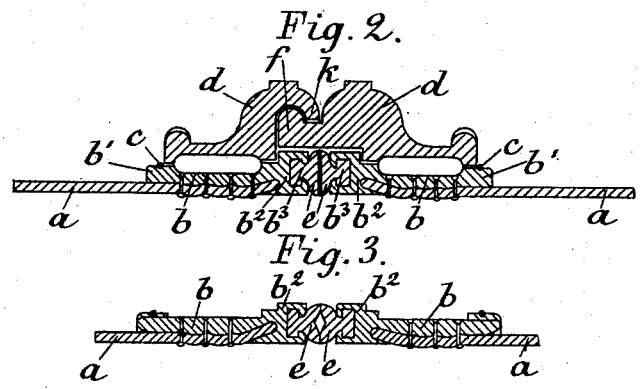
Fig. 2.
Fig. 3.
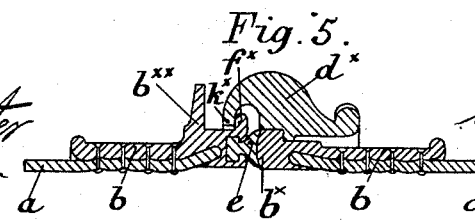
Fig. 5.
Witnesses:
Inventor.
Carl A. G. Storz
by Herbert W. T. Jenner
Attorney (No Model.) 2 Sheets—Sheet 2.

C. A. G. STORZ.
HOSE PIPE COUPLING.

No. 489,106. Patented Jan. 3, 1893.

Witnesses:

Inventor.
Carl A. G. Storz
by Herbert W. T. Jenner
Attorney.

UNITED STATES PATENT OFFICE.

CARL AUGUST GUIDO STORZ, OF FRANKFORT-ON-THE-MAIN, GERMANY.

HOSE-PIPE COUPLING.

SPECIFICATION forming part of Letters Patent No. 489,106, dated January 3, 1893.

Application filed December 29, 1890. Serial No. 376,071. (No model.) Patented in Germany September 24, 1886, No. 44,341; in England January 26, 1887, No. 1,275, and in Switzerland November 26, 1890, No. 3,134.

*To all whom it may concern:*

Be it known that I, CARL AUGUST GUIDO STORZ, engineer, a subject of the Grand Duke of Baden, residing at Frankfort-on-the-Main, in the Kingdom of Prussia and German Empire, have invented certain new and useful Improvements in Hose-Pipe Couplings; and I do hereby declare the following to be a full, clear, and exact description of the invention, such as will enable others skilled in the art to which it appertains to make and use the same.

Letters Patent for this invention have been obtained in England, No. 1,275, dated January 26, 1887; Switzerland, No. 3,134, dated November 26, 1890; and in Germany, No. 44,341, dated September 24, 1886.

This invention relates to couplings for pipes and more particularly for flexible hose pipes. This invention consists in the novel construction and combination of the parts hereinafter fully described and claimed.

In the drawings: Figure 1 is a perspective view of one part of the coupling. Fig. 2 is a longitudinal section through one half of the two parts of the coupling when tightly connected. Fig. 3 is a similar longitudinal section showing the ends of the pipes and the packing before being compressed in connecting the pipes. Fig. 4 is an end view of the coupling shown in Fig. 1. Fig. 5 is a longitudinal section, similar to Fig. 2, but shows a modification of the coupling.

Sleeves $b$ are secured on the ends of the pipes $a$ which are to be connected. These sleeves are both alike, and are secured to the pipes in any approved manner. Each sleeve $b$ is provided with a circular flange $b^2$, and $e$ is an elastic packing ring secured in a circular recessed groove in the face of the said flange. The recessed groove may be dovetailed in cross-section, or T-shaped as shown, or of any form which will hold the ring $e$ securely. The ring $e$ has a V-shaped groove in its face and is wider on its face than where it enters the flange, thus making it of a fish-tailed shape in cross-section as shown in Fig. 3. This shape is important to give the joint the necessary elasticity. When the parts of the coupling are tightly secured, the faces of the packing rings become flat as shown in Fig. 3, but the joint will be tight when the packing rings are gently pressed together without being flat. Rings $d$ are journaled on the sleeves $b$, and are both alike. Each ring runs against a shoulder behind the flange $b^2$, and is kept from coming off by a wire ring $c$ sprung into a groove in the collar $b'$ at the end of the sleeve beyond the end of the ring $d$. Each ring $d$ is provided with two hooks $f$ projecting from its face opposite each other, and has two lips $k$ between the said hooks. Small spaces $h$ are left on one side of the hooks, and spaces $g$ on the other side, the spaces $g$ being rather broader than the hooks so that when the parts of the coupling are pushed together the hooks $f$ may pass through the spaces $g$. The spaces $h$ are merely clearance spaces at the ends of the lips $k$, and may be dispensed with if desired. The inner surface of each lip $k$ is inclined in opposite directions, the lip being thickest at the point $k'$, (see Fig. 1) a short distance from the opening $g$. The stems $f^2$ of the hooks turn in the spaces $i$, and the front edges $f'$ of the hooks are inclined to permit the hooks to engage readily with the lips $k$.

When the parts of the coupling are pushed together, the rings $d$ are revolved until the hooks $f$ are under the parts $k'$ of the lips, and the faces of the packing rings are squeezed flat as shown in Fig. 3. The rings $d$ are then revolved to a limited extent in the same direction, thereby partially relieving the packing rings of pressure and allowing them to expand, but not sufficiently to break the joint.

The parts of the coupling are locked by the action of moving the hooks past the points $k'$. The arrow in Fig. 1 shows the direction in which the opposite ring of the coupling is revolved to connect the two parts.

The grooves in the faces of the rings $e$ are important as they permit the rings to expand when the parts of the coupling have been moved forward past the locking points, and the joint remains tight being secured against internal pressure by the inner edges of the rings $e$, and against external pressure, as when the pipe is used as a vacuum pipe, by the external edges of the said rings, the pressure in each instance serving to press the respective edges of the rings together.

In the modification shown in Fig. 5, only one of the sleeves $b$ is provided with a packing ring $e$, the opposed sleeve having a curved face $b^\times$ for the ring $e$ to bear against, but both sleeves might have rings $e$, the same as shown in Fig. 3, if desired.

In Fig. 5, a single ring $d^\times$ is used, and is provided with lips $k^\times$ the same as shown in Fig. 2 and marked $d$ and $k$ respectively, but the ring $d^\times$ has no hooks $f$. The hooks $f^\times$ which engage with the lips $k^\times$ are similar to the hooks $f$ but are formed on the sleeve $b$ instead of on a ring $d$, and the said sleeve $b$ is further provided with a flange $b^{\times\times}$ for convenience in handling it.

What I claim is:

1. In a pipe coupling, the combination, with two sleeves adapted to be secured to the ends of the pipes, of a packing ring of elastic material provided with a groove in its face and secured to one of the sleeves, and a ring journaled on one of the sleeves and provided with lips $k$ thickest at the points $k'$ and having their inner surfaces inclined in opposite directions from the said points, and adapted to engage with hooks carried by the opposed sleeve, substantially as and for the purpose set forth.

2. In a pipe coupling, the combination, of two similar half couplings, each comprising a sleeve adapted to be secured to the end of the pipe, a packing ring secured to the sleeve and provided with a groove in its face, and a ring journaled on the sleeve and provided with hooks $f$, spaces $g$ wider than the hooks, and lips $k$ thickest at the points $k'$ and having their inner surfaces inclined in opposite directions from the said points, substantially as and for the purpose set forth.

In testimony whereof I affix my signature in presence of two witnesses.

CARL AUGUST GUIDO STORZ.

Witnesses:
ALVESTO P. HOGUE,
JEAN GRUND.